United States Patent [19]
Freedman et al.

[11] Patent Number: 5,675,721
[45] Date of Patent: Oct. 7, 1997

[54] COMPUTER NETWORK DATA DISTRIBUTION AND SELECTIVE RETRIEVAL SYSTEM

[76] Inventors: Aaron S. Freedman, 205 Barrington Rd., Syracuse, N.Y. 13214; Mark L. Neri, 1731 Rutledge Rd., Longwood, Fla. 32779

[21] Appl. No.: 694,165

[22] Filed: Aug. 8, 1996

[51] Int. Cl.$^6$ .............................. G06F 15/00; G06F 3/00; H01J 13/00

[52] U.S. Cl. .................... 395/129; 395/502; 395/200.01; 395/200.13

[58] Field of Search ........................ 395/129, 502, 395/503, 504, 505, 506, 507, 508, 509, 200.01, 200.09, 200.13, 200.14, 200.15, 200.16, 200.17, 200.18, 200.19

*Primary Examiner*—Kee M. Tung
*Assistant Examiner*—Ba Huynh
*Attorney, Agent, or Firm*—Timothy J. Shea, II

[57] ABSTRACT

A method of accessing a distributed virtual world such that the only data requested of the network data sources and transmitted to the requesting computer is the data that codes for objects that the viewer can perceive, and to prioritize the data to be sent in order of its perceivability so that only relevant data is sent to the user.

37 Claims, 2 Drawing Sheets

COMPUTER NETWORK DATA DISTRIBUTION AND SELECTIVE RETRIEVAL SYSTEM

FIELD OF THE INVENTION

This invention relates generally to a computer network data distribution and retrieval system capable of enabling the creation and presentation of a large, variably detailed, three-dimensional virtual reality world with data stored on distributed network sources and obtained by computer network transmission. A virtual world created using the data distribution and retrieval system of the present invention may be accessed by one or more users concurrently. The invention further relates to a method of user access to this virtual world, and a method of user interaction with objects and with other users in the world.

BACKGROUND OF THE INVENTION

The creation of virtual reality (VR) worlds using data stored on sources distributed across a computer network, such that individual computer users may "enter" the VR world by accessing the computer network, has been a longtime goal of computer scientists. Of particular interest are VR worlds that may reside on wide area computer networks such as the Internet.

Although hypothetical VR worlds that users may enter and interact with—and which are indistinguishable from actual reality—have been shown in television shows such as "Star Trek: The Next Generation" and "Mad About You," these representations, like most popular representations of VR technology, merely use videotape special effects to create an illusion of a virtual world. In contrast, a true virtual world is one in which every object, including a user's image, is digitally coded and rendered.

A more authentic virtual world was used as a critical dramatic device in "Disclosure," the recent movie based on the Michael Crichton novel of the same name. In that world, a user could retrieve data from electronic files by entering a digitally rendered filing room (representing a data storage device), opening a rendered filing cabinet (directory), and removing rendered sheets of paper (documents) stored in rendered manila folders (folders). Further, the user saw a digital image of himself and other users in the world. Like most of Crichton's work, this representation of VR technology was just barely fictional.

However, to create its great level of user immersion in the VR world, the fictional VR system in "Disclosure" required that the user don a special full-body suit equipped with goggles and motion/position sensors. Further, the user could only access the world via a special gimbaled platform to which the suit was attached. Indeed, the use of goggles, gloves, and other apparatus is considered to be a necessary condition of virtual reality. It is understood for the purposes of the present invention that the discussion pertains to two-dimensional representations of a three-dimensional environment. Thus, the present invention relates to a virtual world that may be accessed solely via a flat display screen, although the use of other interface devices such as goggles, gloves, or VR suites is not precluded.

While recent advances in computer hardware and telecommunications technology have enabled the creation of rudimentary virtual worlds that may be accessed via a computer network, there remain several significant obstacles to creating a world in which motion is experienced in real-time and in which users can interact with inanimate objects in the world and with other users. The most significant problem with creating a large virtual reality world is that a world sufficiently large and detailed to be interesting contains more data than can be transmitted to the user's computer in a reasonable amount of time. In addition, even with the tremendous advances in microprocessor speed, network speed, and data storage capability of personal computers, the amount of data and data processing required to create an interesting virtual world overwhelms currently available systems.

Previous attempts to create a large virtual reality world on a computer network, specifically the Internet, have been unable to clear this technological hurdle and accommodate the extensive data that current VR technology requires. Two current approaches to the problem that fail in different ways are current VRML implementation and Alpha World.

Currently, the most popular method of sending three-dimensional scenes across the Internet is using the Virtual Reality Modeling Language (VRML). VRML's operating principle is that every object located in a particular scene is described fully by data contained in an ASCII text file. When a user wants to enter this scene, under current implementation the entire file is transferred en masse over the network to the user's computer at one time. An application program on the user's computer can then access and manipulate the text contained in this file to render the three-dimensional scene. Once the scene has been rendered, the user can move around in this world and interact with objects contained within it.

There are several problems with the current VRML implementations. The greatest flaw is that data is not efficiently transferred over the network. Also, the data storage and processing limitations of currently available personal computers limits the complexity of the scene. Finally, current VRML implementations require the user's computer to do a lot of unnecessary work.

These current VRML implementations are inefficient in its use their network resources because they do not differentiate between relevant and irrelevant information. Each VRML file contains all of the data necessary to render completely every aspect of a particular scene. Although some of the objects coded by the data will be seen by the user at any one time, many more of the coded objects either are too far away from the user to be visible, are outside the user's cone of vision and therefore not visible, or are hidden from the user's view behind other objects. Thus, a lot of valuable time and resources are spent on transferring to the user's computer and subsequent processing of data that is unused and unnecessary at any given time.

Also, the large data files needed to represent all objects in an entire scene take a long time to transfer over the network. The long transfer time causes the user to experience long data transfer delays when entering each new scene. Further, once the data files transferred, they are unwieldy for even the fastest computers to process. Thus, there are often long processing delays when the user moves about the scene. These seemingly interminable delays significantly detract from the virtual reality experience.

Another problem with the current VRML implementations is that network delays grow rapidly as the complexity of a scene is increased. If a scene has twice as much detail (e.g., twice as many objects), it will take twice as long to transfer across the network the data needed to create the scene. The scene designer faces an intractable problem when determining how much detail to put into a given scene. If too little detail is included, users who have fast network connections or who are willing to tolerate delays will not get as much graphic data as they would like. The virtual world is not as interesting to them. But, as more detail is included to make the scene interesting to this first group of users, other users with slower network connections or with computers that cannot render highly detailed worlds will be forced to wait a long time to receive information that their computers cannot display at an acceptable speed. Thus, regardless of how much detail is included in the scene, someone is bound not to have an enjoyable VR experience.

Also, these current VRML implementations place more demands on the user's computer than is necessary. First, the user's computer must store all of the data contained in each VRML file either in active memory (RAM) or cache it to disk, both of which slows the processing. Even worse, before rendering the scene, the computer must prioritize the data to determine what parts of the scene should be displayed, discarding the irrelevant data. This can be a time consuming process. Very few computer users today have enough RAM to easily store and manipulate all of the data needed to create a reasonably complex three-dimensional scene. Further adding to the problem, the computer cannot begin to do any processing until after the entire VRML file has been received. It can neither display a good approximation of the scene or begin to process the entire scene until after the file transfer is completed.

In conclusion, the current VRML implementations not the best way to provide three-dimensional worlds over a computer network because it uses excessive network bandwidth, it wastes computer resources, and it limits the complexity of the scenes that can be represented.

Alpha World is another attempt at creating a three-dimensional world on the Internet. Unlike the current VRML implementations, Alpha World does not send all at once all of the data needed to create the entire VR world. However, Alpha World has other deficiencies that detract from an interesting VR experience.

Alpha World's approach is to divide the world into a grid of square regions. Only a few regions to each side of a viewer are retrieved from the network and displayed at any one time. This method allows the world to be arbitrarily large. However, there are many problems with Alpha World's method; most of which relate to how it uses the network. The specific problems can be divided into two categories, Data Retrieval and Data Processing.

The first problem with Alpha World's use of the network is in the actual data it requests. Specifically, Alpha World will request from the network objects that cannot be seen. Also, Alpha World fails to request objects that can be seen. For example, when a person walks down a street in Alpha World, the road appears to come to an end in front of him. He can not see into the distance. However, the program has spent valuable time requesting objects located inside a house that is to the left of the person and that cannot be seen.

The problem is most apparent when the user elevates above the world and looks down, taking a bird's eye view. All the user sees is a small patch of streets and buildings directly below. There are no objects around this patch or on the horizon. However, the objects in this patch are unnecessarily detailed. The program spends time getting detail for small objects, while large objects that should be seen are not sent over the network. Alpha World could solve this problem by showing the objects contained in more squares of the grid. However, in order to maintain the same amount of data to be sent over the network, each square would have to have fewer objects. The result is that although Alpha World can be arbitrarily large, it cannot also be highly detailed.

This inefficient use of the network also leads to a problem in user interaction with the virtual world. When a new grid square gets close enough to the user, Alpha World requests from the network all of the data for all of the objects residing in that square. When these objects are received, they are displayed all at once. This effect leads to choppy movement of objects on the display screen, which detracts from the VR experience and makes it difficult for the user to interact with the objects in the world. Also, the objects are cached locally all at once when they are received. This procedure takes time and causes the entire program to pause for a couple of seconds. During this pause it is impossible for the user to interact with other people or objects in the virtual world.

Another problem with Alpha World is the time spent processing data for all of the hidden and irrelevant objects that it receives from the network. This inefficient use of processing power forces Alpha World to make sacrifices in the complexity of the world.

One such sacrifice is height. Although Alpha World looks like a three-dimensional world, it is actually flat. Objects cannot be stacked on top of each other. The term used to describe such a world is "two and a half dimensional." Alpha World is not able to process enough information for a fully three-dimensional world because it spends too much time processing hidden objects. Also, Alpha World does not always display the world correctly. Sometimes objects in the distance are displayed in front of objects that are actually in the foreground.

This effect occurs because Alpha World does not z-buffer. Nor could Alpha World do this, as z-buffering would consume too much processing power since the data that codes for hidden objects would still need to be processed.

Another problem caused by Alpha World's inefficient processing is that all objects must be simple shapes, since complex objects with many faces would require too much processing power to render. Thus, most of the objects in Alpha World are simple bitmaps which look the same from all angles. In addition, every object must fit within the square blocks. In order to build a larger object, these blocks must be pieced together. This limitation makes it difficult to create objects oriented at an angle. The result is that a town in Alpha World will look like it is laid out on a grid.

Other approaches to storing and retrieving information in a distributed network also have technological drawbacks that create user problems. For example, a major problem with the World Wide Web is that its servers often become overloaded. This overloading slows down the interaction with every user using that server. Physically, there is no need for this problem to occur. For every server that is overloaded, there are many other servers that are doing nothing, or very little. However, in the past, there has been no mechanism for distributing the load from the overburdened servers to these other unused or underused computers. What is needed is a method of propagating objects around the network in order solve the problem of server overload. In such a distributed, decentralized system, there would be no servers or clients. Each computer in the system would run a program that acts as a node.

In order to create a large virtual reality world for use on such a computer network, a new method is needed to transfer and process the enormous amount of data necessary to create a world that is both useful and interesting to the user. Because an interesting scene contains too much data to transmit all at once, the virtual world should be arranged such that detail for larger objects is represented by smaller objects. The goal should be to send the detail for only those objects that are most relevant to the user at each point in time. A good way to measure the relevance of an object is to measure its perceivability to the user.

Accordingly, it is an object of this invention to provide a computer network data distribution and retrieval system wherein each computer in the system acts as a node, thereby enabling perceivable objects to be propagated across the network and eliminating the incidence of server overload.

It is another object of the present invention to provide for creation on a computer network of a large and detailed virtual reality world that is both useful and interesting to the user.

It is a further object of the present invention to create a method of accessing a distributed virtual world such that the only data requested of the network data sources and transmitted to the requesting computer is the data that codes for objects that the viewer can perceive, and to prioritize the data to be sent in order of how well it can be perceived so that only relevant data is sent to the user.

It is another object of this invention to provide a computer network data distribution and retrieval system wherein detail for larger objects is represented by smaller objects in order to facilitate sending across the network only the objects that the viewer can perceive.

SUMMARY OF THE INVENTION

The objects of the present invention are met by a computer network data distribution and retrieval system comprising computers that function as data storage repositories and network nodes, and that also enable user access to data distributed across the network. Although the embodiment discussed is the use of the computer network data distribution and retrieval system of the presently claimed invention to create a three-dimensional virtual world, the present invention relates to all types of data that can be arranged in levels of increasing detail and for which a perceivability index can be measured.

There are no dedicated servers or clients in the computer network data distribution and retrieval system of the presently claimed invention. Each computer in the system runs an application program that enables that computer to act as a network node. When the application program needs an object that is not stored on the local computer, it sends a request to the remote computer that owns the object. If that remote owner computer is not already responding to requests from too many other requesting computers, the owner computer transmits the object to the requesting computer across the network and adds the requesting computer to the owner computer's list of requesting computers to which it is responding.

However, if the computer that owns the object is already responding to its maximum number of requesting computers, the owner computer removes from its queue one of the prior requesting computers to which it had been responding. The owner computer also sends the removed requesting computer a list of all the other requesting computers to which the owner computer has been responding. The removed requesting computer can then send its data requests for more detail about the object to the computers in that list. This process continues until the computer that can respond to requests the fastest is found. Thus, perceivable objects will propagate around the network and every requesting computer will attempt to retrieve objects from nearby, fast computers.

Other objects, features and advantages will be apparent from the following detailed description of preferred embodiments thereof taken in conjunction with the accompanying drawings in which:

DETAILED DESCRIPTION OF PREFERRED EMBODIMENTS

In order to understand the methods used by the presently claimed computer network data distribution and retrieval system to achieve the technical objectives of the invention, it is necessary to describe how the system creates perceivable objects and propagates them across the network.

Perceivable Objects

In the computer network data distribution and retrieval system of the present invention, every piece of data that the user's computer network access application program can present to the user is in the form of a perceivable object. These perceivable objects are identified by a URI (Universal Resource Identifier) that includes information about the remote computer that owns the object, as well as the object's location on that remote computer.

In addition, the user's computer retains local copies of all perceivable objects that it has requested. These local copies need not contain all of the information relevant to a given perceivable object. Instead, the local copies contain only the information that is necessary to perform the processing tasks currently needed by the user's computer. If a local perceivable object copy does not have certain necessary information, the user's computer requests the information over the network and obtains the needed information from another copy of the perceivable object on another network computer.

Messages

All network communication is achieved by transmission of messages among the networked computers. Each perceivable object is associated with one message for each type of interaction that may be performed on the perceivable object. Perceivable objects use messages to accomplish both system functions and user interaction with the object. Each type of message may contain various values that more clearly specify the message's purpose. The use of messages for all network communication simplifies the design and increases the extendibility of the application program.

Network Efficiency

There are two key optimizations that enable the application program to effectively present to the user a large and detailed interactive world with data distributed across a computer network. The first optimization is the selective retrieval of information about the world. The second optimization is the propagation across the network of heavily accessed data from high traffic nodes to lower traffic nodes.

Selective Data Retrieval

The perceivable objects in the world that the application program presents to the user are arranged in a hierarchical structure that makes it possible at any given point to send across the network only those portions of the world that the user can perceive. Since the number of perceivable objects that a user can perceive at any one time does not increase with the size or detail of the world, this approach enables the creation and use of arbitrarily large and detailed worlds.

The process begins when a single perceivable object is created. The representation of this and all other perceivable objects contains a simple approximation of the structure of the perceivable object and a manifest flag indicating whether the perceivable object should be presented to the user. This flag is initially set, indicating that the perceivable object will be presented to the user. It also contains a list of the network locations of smaller perceivable objects that together combine to represent the main perceivable object in higher detail.

When it is time to present the initial perceivable object to the user, the perceivable object is processed as follows. First, its perceivability from the user's viewpoint is calculated and is compared to the detail threshold value. Both perceivability and the detail threshold depend on the application program and are described below. If this perceivability is less than the detail threshold value, then the perceivable object's manifest flag is set, the perceivable objects that make up its details are deleted, and any pending network requests by the perceivable object are canceled. If the perceivable object's perceivability is above the detail threshold, the manifest flag is tested. If this flag is set, the perceivable object is presented to the user, and a request for its sub-objects is put into the network priority list. Otherwise, each of the smaller perceivable objects that make up the current perceivable object is processed in the same way as the main perceivable object. The flowchart in FIG. 1 shows this process.

The perceivable objects that the application program presents to the user are linked together in a tree structure. Each representation of a perceivable object in the virtual world contains two important pieces of information. The first piece of information is a simple representation of the physical structure of the perceivable object (e.g., in the case of a geometrical object, whether it is generally a circle, square, rectangle, triangle, etc.). The second piece of information is a list of pointers to other, smaller perceivable objects whose union comprises a more detailed representation of the structure of the main perceivable object. These smaller perceivable objects can have further sub-objects of their own. This hierarchical structure not only makes it possible to send across the network perceivable object representations having different levels of detail, but also facilitates extremely efficient rendering of the world to a graphic or other display capable of presenting the object.

Because the world that the application program presents is so vast, the program must carefully choose which data it will request from the network. As shown in FIG. 1, when the application program presents to the user a VR world from the viewpoint of the user, it calculates for each perceivable object the perceivability of that object to the user. The application program compares the calculated perceivability value with a certain threshold value. If an object's perceivability value is greater than the threshold value, the application program will then instruct the object to add the sub-objects for that object to the network request queue so that detail data for those sub-objects can be presented to the user. Once in the request queue, the sub-objects can optionally send messages requesting more detail about themselves from another computer that has that detail. If an object's perceivability value is less than this threshold value, the application program will instruct the object to delete any sub-objects for that object and remove them from the network request queue. This process is performed each time the virtual world is presented to the user.

Figure 1:
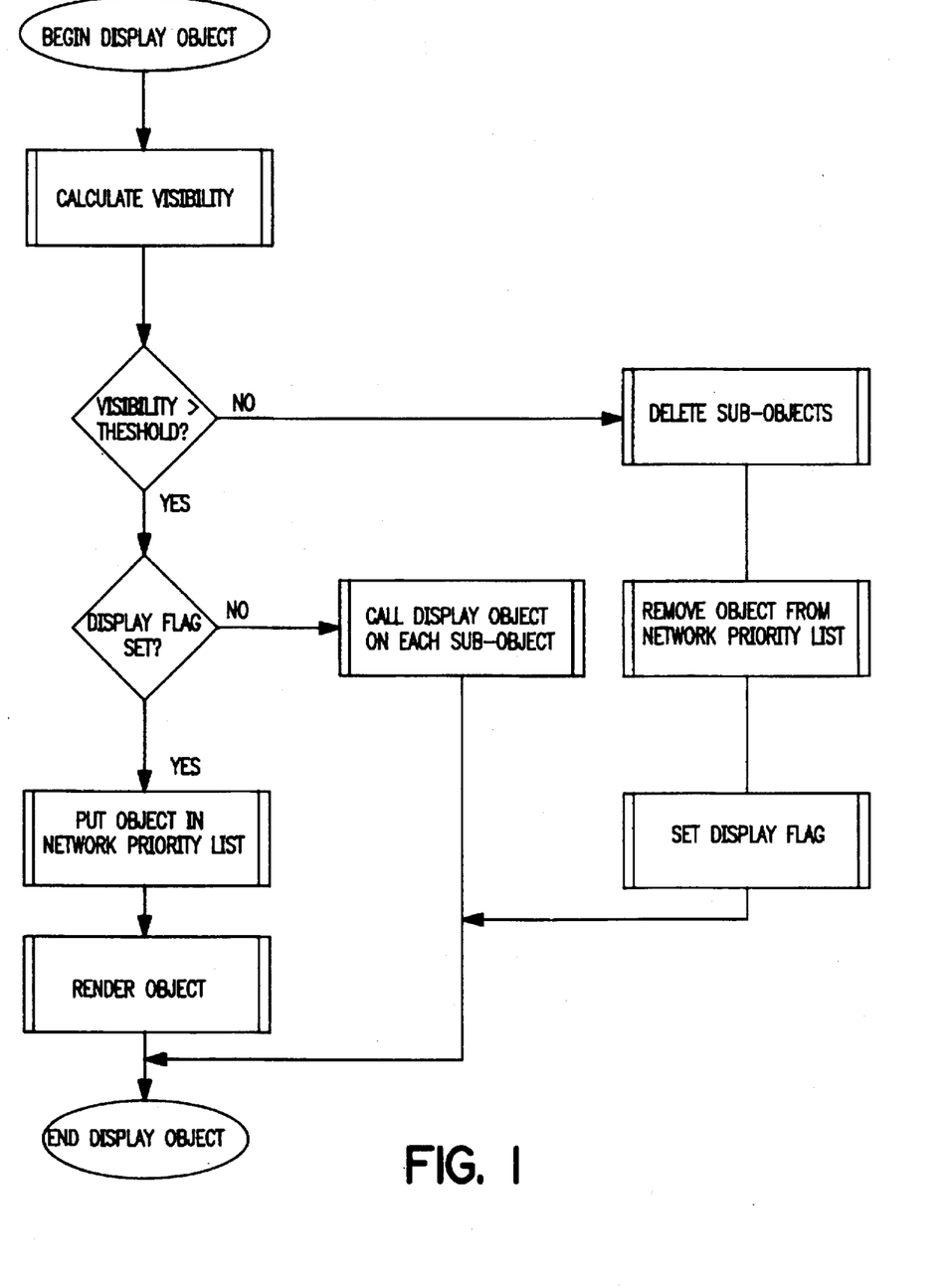
FIG. 1 shows a schematic view of how the data storage and retrieval system of the present invention determines whether a perceivable object is to be displayed to the user.

Referring again to the flowchart of FIG. 1, it may be understood that the following code operations will enable the claimed invention to accomplish the desired objectives:

```
DisplayObject (Object)
    Visibility ← GetVisibility (Object)
    If Visibility > Threshold
        If DisplayFlag
            PutObjectInNetworkPriorityList (Object)
            RenderObject (Object)
        Else
            For Each SubObject (Object)
                DisplayObject (SubObject)
    Else
        For Each SubObject (Object)
            Delete SubObject
            RemoveObjectFromNetworkPriorityList (Object)
        DisplayFlag ← True
        RenderObject (Object)
```

The network request queue prioritizes messages received from all perceivable objects. Often, there is more than one perceivable object that needs to use the network to inquire about its physical structure. In this case, the request generated by the perceivable object with the greatest perceivability value is sent across the network first. Thus, the data that is most perceivable to any user is retrieved first, so that the user's view of the world is as detailed as is possible. When responses to these requests are received, new perceivable objects are created to represent the increased detail. If the perceivability of any of these objects is above the threshold value, the application program will then request more detail for those objects. A critical feature of the presently claimed invention is that the prioritization of information requested over the network allows for tremendous increases in data transmission and processing efficiency. The end result is a more fluid, interactive experience for the user.

At some point after a request is made, information about the requested perceivable objects arrives at the user's computer from the network. At this point, the perceivable object that requested this information has its manifest flag cleared, and the new perceivable object's manifest flags are set. These new perceivable objects represent a more detailed description of the requesting perceivable object. At this point, the main perceivable object is presented to the user again, to reflect the additional detail that has been received.

Perceivability

The above operations are applied to perceivable objects in a virtual reality world to allow users to move around in a boundless world having an unlimited amount of detail. The world contains objects that are visible, audible, tactile, or perceivable in any way.

Each perceivable object's sub-objects must represent a more detailed description of that perceivable object. For a visual perceivable object that is represented by a simple polyhedron, the sub-objects are each smaller polyhedra that, when combined, form a more detailed representation of the original perceivable object. For an auditory perceivable object that is represented as digital sound sample, the sub-objects are higher-quality representations of the sound. For a tactile perceivable object that is represented as a two-dimensional height map, the sub-objects are smaller, more detailed height maps that, when put together, comprise a more detailed version of the original tactile map.

The perceivability of a three-dimensional visually perceivable object is its degree of visibility. A useful way to measure a visually perceivable object's degree of visibility is by calculating the projected area that the object occupies in the user's field of view. This measurement is improved by setting the visually perceivable object's perceivability value to zero if the visually perceivable object is either completely hidden by other visually perceivable objects or is completely outside of the user's visual field. The perceivability measurement is refined by considering a visually perceivable object's distance from the center of the user's visual field, the perceivable object's distance from the user, its brightness, and its relative velocity, as objects can blur when in motion. Advanced implementations of the visibility function consider not only the current visibility of a perceivable object, but also take into account predictions of future visibility.

The perceivability measurement of an audible perceivable object is its audibility. This audibility is determined by the user's proximity to the source of the sound. This measurement is refined by considering the sound wave deflection effects of visually perceivable objects which may block the sound, the masking effects of other, louder sounds that the user is currently hearing, and the relative velocity and direction of movement of the audible perceivable object (i.e., the source of the sound) to account for the Doppler effect. As with visually perceivable objects, advanced implementations consider predictions of future audibility.

The perceivability measurement of a tactile perceivable object is determined by whether the user is currently or is soon likely to be touching the tactile perceivable object.

All of these perceivability measurements must be weighted appropriately so that they can be compared against each other. The weight that different types of perceivability are given depends on the user's preferences, both predefined and queried, as well as on the ability of the user's computer to present the different types of information.

Detail Threshold

The detail threshold value controls how much information will be requested from the network. If this threshold value is set too high, then not enough detail will be requested and the user will not be taking advantage of the network's full capacity. If the threshold value is set too low, a great deal of information will be requested from the network, but the user's computer may not be able to present it fast enough. Therefore, the threshold value is dynamically set to the point where the computer is just able to process and present all of the data that it receives.

Figure 2:
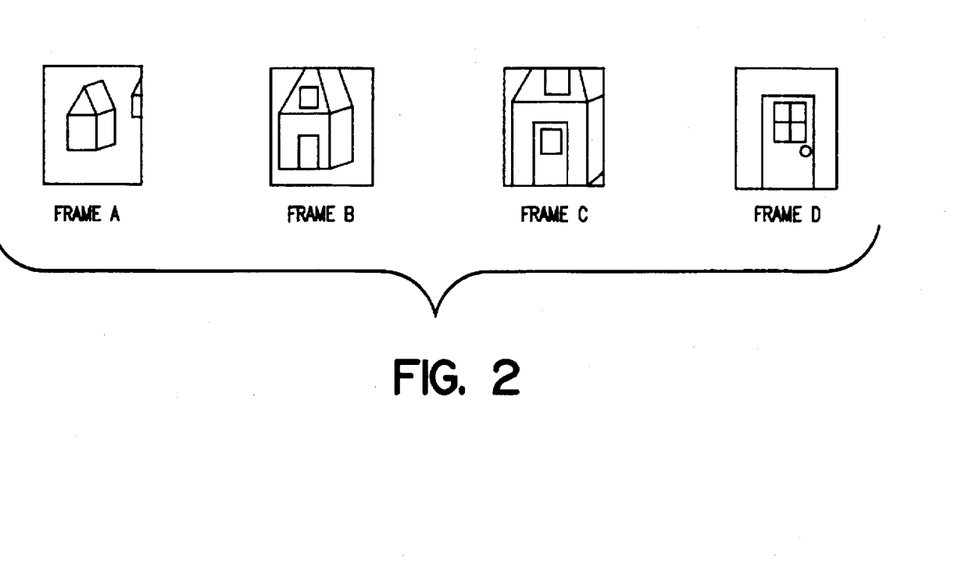
FIG. 2 shows a pictorial representation of variations in the level of detail related to an object that is presented to the user depending upon the area of the user's visual field that the object occupies.

FIG. 2 is an example of how visible objects are presented to the user, in this case, what happens as a user approaches a house in the distance. As shown in the figure, the level of detail about a given perceivable object that is conveyed to the user varies depending upon the object's perceivability, in this case the visual field area that the perceivable object occupies. This example shows a user's changing view as the user approaches one or two houses. The box around each frame represents the user's field of view in each frame. Both houses are stored on a remote computer on the computer network and the user has never before viewed these houses in detail. Note that as the user approaches the foremost house in the scene, the number of polygons in the scene remains constant at about six or seven.

Frame A: Initially, both houses are in the distance and are not detailed. There are six polygons (perceivable objects) visible in the scene.

Frame B: As the user approaches the closer of the two houses, the perceivability values of both the base of that house and the roof of that house exceed the threshold value for those objects and both objects send messages across the network requesting more detail about themselves. In response to these requests, data coding for the door and window are transmitted from the computer where the house is stored and are received by the computer running the application (this may be the same computer) and are displayed in the scene. At the same time, when the user moved closer to the first house, the more distant house disappeared from the user's field of vision. This more distant house was therefore removed from the display tree and is no longer represented in the scene. Thus, the number of perceivable objects in the scene remains constant at six.

Frame C: As the user gets even closer to the first house, the door becomes large enough to surpass the detail threshold value for that object and it requests additional detail about itself. However, the detail on the door is a window, and that window is the same as the window on the second floor. Therefore, a copy of that second floor window is created and displayed on the door. No network activity is necessary. The addition of the window to the door increases the number of visible perceivable objects in the scene to seven.

Frame D: As the user approaches the door, the window in the door surpasses the detail threshold value for that object and it requests more detail about itself from the network. Data coding for the glass panes in the window are transmitted from the computer that owns the window to the computer running the application (again, this could be the same computer) and are presented to the user. The rest of the door also surpasses the detail threshold value for that object and it requests, then receives, additional data about itself, in this case, the data that codes for the doorknob. The roof and one of the walls of the house are now outside the user's field of vision and those objects are deleted from the display tree. For this reason, the window on the second floor does not request more detail about itself. Because those additional perceivable objects were deleted from the display tree, there are still only seven perceivable objects visible in the scene.

Propagation of Data Objects

Figure 3:
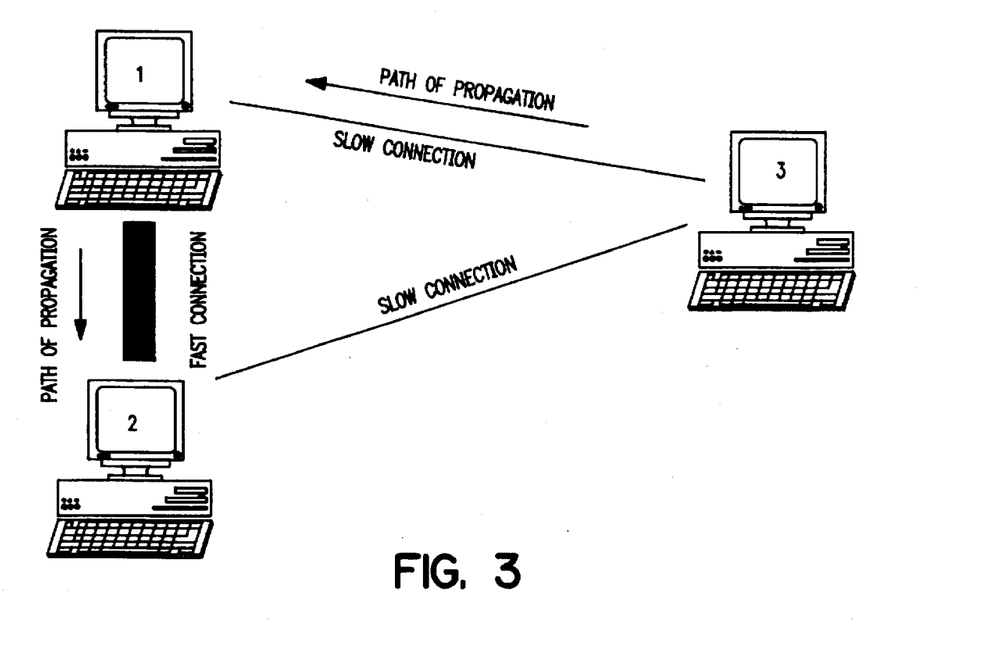
FIG. 3 shows a schematic representation of perceivable object propagation on a three-node computer network.

As discussed above, a the data storage and retrieval system of the present invention propagates perceivable objects around the network in order to solve the problem of server overload. There are no servers or clients in the distributed system; each computer in the system runs a program that acts as a node. FIG. 3 shows perceivable object propagation among three computers.

In FIG. 3, Computer 1 has requested a perceivable object from Computer 3. Computer 2 requests that same perceivable object from Computer 1 instead of Computer 3, because its network connection to Computer 1 is faster. An example of when this situation would occur is if Computers 1 and 2 are in the same local area network, and Computer 3 is in a different country.

Application to Three-dimensional Worlds

These concepts of perceivable objects and messages, including selective data retrieval (based on the perceivability of perceivable objects and their attendant detail threshold values) and propagation of perceivable objects across the network, may be used in a data storage and retrieval system of the present invention to create a large and detailed three-dimensional world from data distributed across a computer network. Users would access this world by means of an executable computer program resident on their hard disk. When a user runs the application program, the world would appear on the user's computer screen.

The user would see buildings and trees and other real-world perceivable objects in the three-dimensional environment. The user would also see three-dimensional graphical representations of other users currently in the world and would be able to talk and interact with those other users. Clubs could exist in the world for users to meet other people with similar interests. Users could be able to play games, such as chess or simulated combat with each other. Companies could open "stores" in the world where they could sell products to interested users, and space could be allocated in which companies could advertise products and services to the users.

The contemplated world could contain graphical representations of information currently available on the World Wide Web, such as libraries and painting galleries. In addition, new information that currently cannot be represented well in the two-dimensional environment of the World Wide Web, such as galleries of sculptures and full scale models of ancient and modern cities, can be presented to the user in an interesting and enjoyable manner.

The data storage and retrieval system of the present invention can be used to immerse a user in a large and detailed virtual reality world without sending the entire world over the network, so that the user can interact smoothly with perceivable objects in the virtual reality world and with other users. In order to accomplish this objective, the method distributes the world about the network and sends only the relevant portions of the world to the user.

Any given user may interact with other users and with perceivable objects in the virtual reality world. Whenever a user interacts with another user or manipulates a perceivable object, e.g., by selecting the object with an aural command, touchscreen command, cursor selection, mouse selection, trackball selection, joystick selection, keystroke selection, or stylus selection in order to request additional detail about the object, the priority of the other user or the object increases. In addition, a user that owns certain objects presented in the world may grant various levels of access privileges to one or more other users. A messaging system handles the interaction between the user and perceivable objects stored on remote computers.

The user interface enables the user to interact with objects and with other users of the virtual world. The specific ways that the user may interact with the virtual world are determined by the user interface. Examples of such interactions are textual, aural, and/or visual communication between one or more users in the world, moving and copying perceivable objects, purchasing actual products represented by perceivable objects, selecting perceivable objects—including digital representations of other users—with a mouse or cursor command, and manipulating perceivable objects, such as opening and closing doors. The user interface allows users to employ these methods of interaction and to effectively interact with and move about the world.

The user interface enables users to create new perceivable objects while they are in the world instead of limiting users to importing perceivable objects into the world. Users and designers will then be able to create new perceivable objects by graphically moving, copying, and modifying other perceivable objects in the world. All of this creation will be carried out while in the three-dimensional virtual environment.

Animation may be provided so that perceivable objects can move on their own. The digital representations of people in the world will then be able to walk, doors will open and close smoothly, and the world will be more realistic.

Creating a Three-dimensional World

The foundations for a large and detailed world will then be created using the application program. The perceivable objects in the world will consist of realistic perceivable objects such as trees, mountains, houses, stores, and lakes, as well as abstract perceivable objects such as World Wide Web documents. Objects can be represented realistically or with a surreal scheme. Both representations will be tested for visual appeal and ease of creation.

Physical Objects

Named perceivable objects may be created and both their geometric descriptions and their sub-objects may be specified. Users with the appropriate authorization can create new perceivable objects and can manipulate existing perceivable objects. In this way, users can use the application program itself to build new perceivable objects in the world.

When designing complex perceivable objects, users may want to use a dedicated three-dimensional design program, such as AutoCAD. To facilitate this process, as well as to allow the use of existing three-dimensional designs, a method of converting files from these programs into the application program's native markup language is provided. This conversion is difficult because the perceivable objects in the foreign file must be organized into a hierarchical structure. Still, there are known methods to create this hierarchical structure and these methods can be implemented with sufficient efficiency. The method that will most probably be used was developed by J. Goldsmith and J. Salmon and is described on page 707 of "Computer Graphics, Principles and Practice" by James Foley.

To aid in world design, a library of commonly used geometric structures may be developed. These structures may be stored locally on each user's computer. The perceivable objects in this library can be put together into more complex perceivable objects. This library greatly simplifies the creation of new virtual reality worlds. The markup language can easily interface with these perceivable objects so an author can work at a high level of abstraction when designing. Also, because these perceivable objects are stored locally, they lessen network traffic.

Some common structures cannot be represented well by static geometric perceivable objects. For example, stairs are quite common and are quite tedious to construct geometrically. Procedure based perceivable objects can help solve this problem. For example, a relatively simple operation may be performed which, when given certain values like steepness and number of stairs, creates a geometric description of a staircase. Procedural perceivable objects contain operations such as the staircase operation and make construction of a world much simpler. If these procedures are stored locally on each user's computer, the values for the staircase can be sent across the network instead of its geometric description. The parametric description is much more compact, so less network bandwidth is used.

Abstract Objects

In order to present the user with information that is not inherently physical, abstract perceivable objects can be created. Each abstract perceivable object takes in data of a specific type and creates a three-dimensional representation of that data. The data can be text, images, or any other data for which a physical representation can be conceived. The processing necessary to convert data into a three-dimensional form can be carried out on a remote computer acting as a gateway. For commonly used types of abstract data whose processing is not excessively expensive, the processing can be carried out by the local computers.

A great amount of information on the Internet is in the World Wide Web's HTML format, so a great deal of content can be added to the virtual reality world by interfacing to this format. HTML does not inherently translate to a three-dimensional representation because the web of links emanating from a document have no physical counterpart. Still, some types of spatial representations of the world wide web are conceivable and can be implemented with the application program. These representations can ease the difficulty of locating information on the World Wide Web.

Most of the information in the physical world is stored as text documents. These documents themselves have no physical representation other than the characters that compose them, so the application program cannot greatly improve the presentation of the information itself. The application program can, however, make it easier for users to find the information that they want by presenting users with an organizational scheme with which they are already comfortable and experienced: a library of books. Using the application program, users can walk through a virtual library that is organized in the same way as a conventional library.

User Interaction

An interactive world is made up of many perceivable objects which can be acted on in useful ways. The application program must therefore provide a user interface with which the user can perform these actions. Because the program seeks to immerse the user in the virtual reality world, the user interface must be easy to use. It must provide the user with controls to navigate through the virtual reality world and interact with the perceivable objects in this world.

Often, specialized hardware is used to allow interaction with a virtual reality world. Because the application program maintains a three-dimensional model of the world that can be displayed from any viewpoint, it is easily interfaced with whatever virtual reality hardware the user may have.

The most basic feature that the user interface provides is to allow users to move around in the virtual reality world. Input devices on a desktop computer can be used in various ways to move a virtual body through a three-dimensional world. Current virtual reality computer games already incorporate many of these interface mechanisms. The application program will allow the user to select a comfortable navigational interface from a list of several of these well established mechanisms.

Although walking may seem the most natural for users in the beginning, the convenience of flight makes it the preferred conveyance in the application program. For some purposes, the user may wish to travel in a virtual vehicle such as a spaceship, a tank, or even a submarine. Because of the true three-dimensional representation that the application program maintains, such customized interfaces and movement constraints are quite easily implemented.

In order to interact with a perceivable object in the virtual reality world, the user must first specify the perceivable object on which he or she wants to act. The easiest way to select a perceivable object is to point at and click the perceivable object using the mouse. However, the exact perceivable object the user is specifying can be ambiguous. For example, if the user clicks the door of a house, it is unclear whether he intends to indicate the door or the house. In some cases, the ambiguity can be resolved by considering what the user wants to do to the perceivable object. If the user is trying to open the perceivable object, then it is clear that the user meant to select the door, because the house cannot be opened. If, however, the user attempts to paint the perceivable object, the application program must explicitly ask the user which perceivable object is intended.

The user must also have a mechanism of specifying what action is to be performed on the selected perceivable object. The user will make this choice from a menu of actions that are allowed on the selected perceivable object. For convenience, perceivable objects will have default methods, so that the user can open a door or read a book simply by double-clicking on them. These shortcuts will make the most common actions readily accessible to the user.

Once the user has selected a perceivable object and the action to be performed on that perceivable object, the application program prompts the user for any additional values that the action supports. A message is then assembled with the desired action and values. This message is then sent to the local copy of the selected perceivable object. If the local computer does not own the selected perceivable object and cannot handle the message, the message is sent across the network to the computer that owns the perceivable object. E.g., a message to open a door must be sent to the computer that owns the door, since a new state of being must be created for the door, while a message to examine the closed door in greater detail can be handled by the local computer, since the local computer already has all of the data relative to the door in its closed state.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A computer network data distribution and retrieval system comprising:
   A) at least two microprocessors connected such that the microprocessors are in communication, forming a network;
   B) at least one data source having data representing at least one object distributed between said at least two microprocessors in said network such that
      i) said data is adapted for categorization into hierarchical detail levels; and
      ii) there exists a method of measuring a perceivability value for said at least one object;
   C) a first application program operating on at least one of said microprocessors functioning such that
      i) said at least one microprocessor acts as a network node,
      ii) said application program controls data retrieval from said at least one distributed data source by
         a) measuring a perceivability value for said at least one object
         b) assigning a priority status to said at least one object based on said measured perceivability value,
         c) comparing said priority status for said at least one object with a predetermined or dynamically varied threshold value,
         d) instructing said at least one object to request additional detail about said at least one object when said priority status equals or exceeds said predetermined detail threshold value,
         e) ordering said requests for additional detail based on the priority of said at least one object relative to the priority of any other object requests, and
         f) sending the first-ordered request across the network; and D) a user operating at least one of said microprocessors.

2. The computer network data distribution and retrieval system, as claimed in claim 1, wherein the perceivability value measured relates to the visibility of said at least one object.

3. The computer network data distribution and retrieval system, as claimed in claim 2, wherein the visibility of said at least one object is measured by calculating the visual field area occupied by said at least one object.

4. The computer network data distribution and retrieval system, as claimed in claim 2, wherein the perceivability value of said at least one object is set to zero if the visually perceivable object is either completely hidden by other visually perceivable objects or is completely outside of the user's visual field.

5. The computer network data distribution and retrieval system, as claimed in claim 2, wherein the perceivability value of said at least one object is scaled by considering the distance of said at least one object from the center of said user's visual field, the distance of said at least one object from said user, the brightness of said at least one object, and the velocity of said at least one object relative to other objects.

6. The computer network data distribution and retrieval system, as claimed in claim 2, wherein the perceivability value of said at least one object is determined by not only the current visibility of said at least one object, but also by predictions of the future visibility of said at least one object.

7. The computer network data distribution and retrieval system, as claimed in claim 1, wherein the perceivability value measured relates to the audibility of said at least one object.

8. The computer network data distribution and retrieval system, as claimed in claim 7, wherein the audibility of said at least one object is measured by calculating the user's proximity to the source of the sound.

9. The computer network data distribution and retrieval system, as claimed in claim 7, wherein the perceivability value of said at least one object is set to zero if the audibly perceivable object is either completely hidden by other perceivable objects or is completely outside of the user's audible field.

10. The computer network data distribution and retrieval system, as claimed in claim 7, wherein the perceivability value of said at least one object is scaled by considering the distance of said at least one object from the center of the user's audible field, the distance of said at least one object from the user, the loudness of said at least one object, and the velocity of said at least one object relative to other objects.

11. The computer network data distribution and retrieval system, as claimed in claim 7, wherein the perceivability value of said at least one object is determined by not only the current audibility of said at least one object, but also by predictions of the future audibility of said at least one object.

12. The computer network data distribution and retrieval system, as claimed in claim 1, wherein the perceivability value measured relates to the tactility of said at least one object.

13. The computer network data distribution and retrieval system, as claimed in claim 12, wherein the tactility of said at least one object is determined by whether said user is currently or is soon likely to be touching the tactually perceivable object.

14. The computer network data distribution and retrieval system, as claimed in claim 1, wherein said at least one object has more than one measurable perceivability value.

15. The computer network data distribution and retrieval system, as claimed in claim 14, wherein said more than one measurable perceivability value are weighted so that they can be compared against each other.

16. The computer network data distribution and retrieval system, as claimed in claim 15, wherein the weight of each said more than one measurable perceivability value is determined by said user's preferences.

17. The computer network data distribution and retrieval system, as claimed in claim 16, wherein said user's preferences are predefined.

18. The computer network data distribution and retrieval system, as claimed in claim 16, wherein said user's preferences are defined by said user in response to a query from said application program.

19. The computer network data distribution and retrieval system, as claimed in claim 16, wherein said user's preferences are also determined by the ability of said user's computer to present the different types of information.

20. The computer network data distribution and retrieval system, as claimed in claim 1, wherein the priority status of said at least one object is determined by user interest.

21. The computer network data distribution and retrieval system, as claimed in claim 20, wherein user interest is determined by a method selected from the group consisting of aural command, touchscreen command, cursor selection, mouse selection, trackball selection, joystick selection, keystroke selection, and stylus selection.

22. The computer network data distribution and retrieval system, as claimed in claim 1, wherein said application program controls data retrieval from said distributed data sources by instructing said at least one object to discard said additional detail about said at least one object when said priority status becomes less than said predetermined detail threshold value.

23. The computer network data distribution and retrieval system, as claimed in claim 1, wherein the system further comprises a second application program operating on at least one other said microprocessor such that said second application program responds to requests for additional detail received from said first application program.

24. The computer network data distribution and retrieval system, as claimed in claim 23, wherein said requests for said additional detail are ordered based on the priority of said at least one object relative to the priority of other objects that have sent requests.

25. The computer network data distribution and retrieval system, as claimed in claim 24, wherein the responses are ordered and sent across the network according to the priority of said request.

26. The computer network data distribution and retrieval system, as claimed in claim 24, wherein the response is sent across the network regardless of the priority of said request.

27. The computer network data distribution and retrieval system, as claimed in claim 1, wherein said priority by which data is sent is determined by both said perceivability value and by a user's interaction preferences.

28. The computer network data distribution and retrieval system, as claimed in claim 27, wherein said preferences can be defined by a user.

29. The computer network data distribution and retrieval system, as claimed in claim 1, wherein said priority by which data is sent is determined by said perceivability value and the ability of said at least one microprocessor to present the different types of information.

30. The computer network data distribution and retrieval system, as claimed in claim 29, wherein said ability of said at least one microprocessor to present the different types of information can be defined by a user.

31. The computer network data distribution and retrieval system, as claimed in claim 1, wherein for priority calculation, said perceivability values are scaled appropriately so that said priorities can be compared.

32. The computer network data distribution and retrieval system, as claimed in claim 1, wherein the threshold value is dynamically set to the point where said at least one microprocessor is just able to process and present all of the data that it receives.

33. The computer network data distribution and retrieval system, as claimed in claim 1, wherein at least one other object may be created by a user.

34. The computer network data distribution and retrieval system, as claimed in claim 33, wherein said user may grant to one or more other users various levels of access privileges to said at least one other object.

35. The computer network data distribution and retrieval system, as claimed in claim 1, wherein at least one object may be manipulated by a user.

36. The computer network data distribution and retrieval system, as claimed in claim 35, wherein manipulation of said at least one object increases the priority of that object.

37. The computer network data distribution and retrieval system, as claimed in claim 35, wherein manipulation of said at least one object is achieved by a method selected from the group consisting of aural command, touchscreen command, cursor selection, mouse selection, trackball selection, joystick selection, keystroke selection, and stylus selection.

* * * * *